April 5, 1927.
E. G. BORDEN
CALORIMETER
Filed Dec. 30, 1922
1,623,299
2 Sheets-Sheet 1
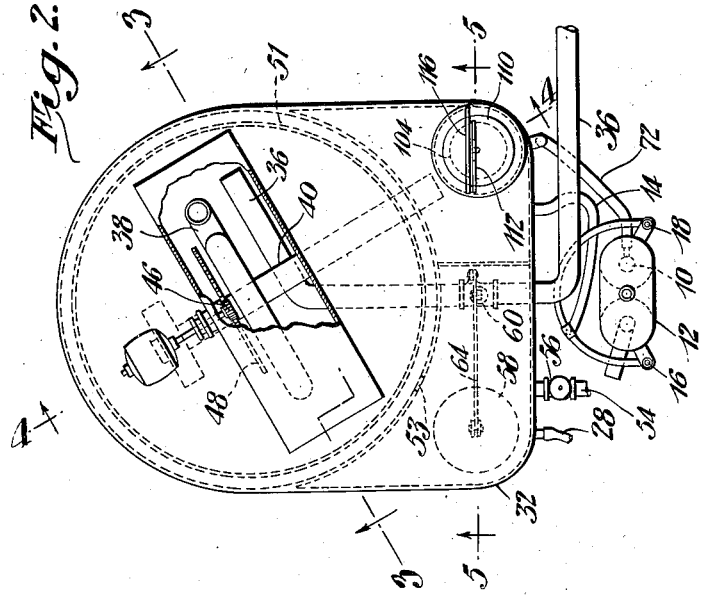
Inventor
Edmund G Borden April 5, 1927.    E. G. BORDEN    1,623,299
CALORIMETER
Filed Dec. 30, 1922    2 Sheets-Sheet 2
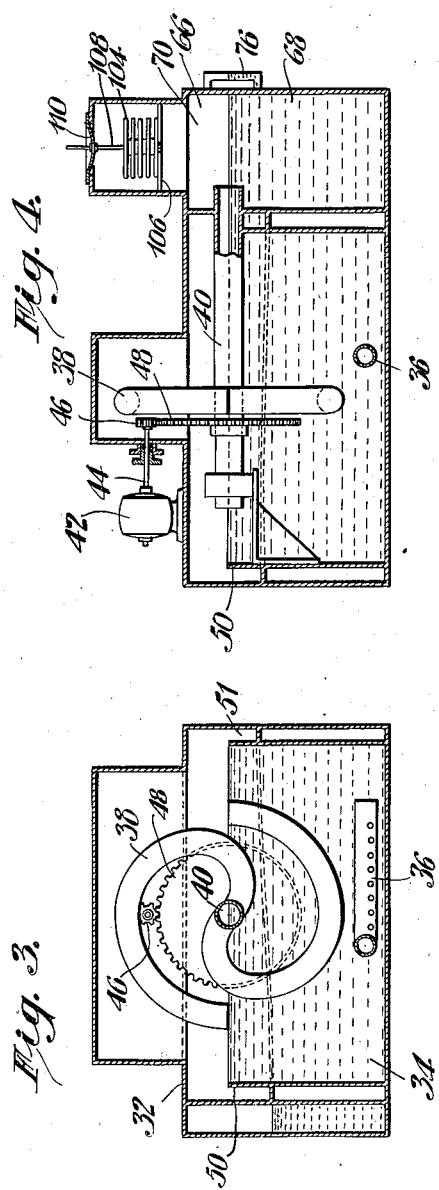
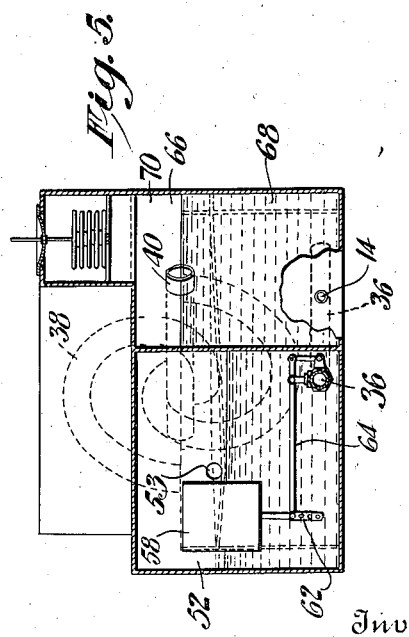
Inventor
Edmund G. Borden Patented Apr. 5, 1927.

1,623,299

UNITED STATES PATENT OFFICE.

EDMUND G. BORDEN, OF QUEENS, NEW YORK, ASSIGNOR TO DOHERTY RESEARCH COMPANY, OF NEW YORK, N. Y., A CORPORATION OF DELAWARE.

CALORIMETER.

Application filed December 30, 1922. Serial No. 609,820.

This invention relates to calorimeters and more particularly to calorimeters for making a continuous record of the heating value of a combustible gas.

Gas is becoming widely used as a fuel, both for domestic purposes and for industrial purposes. It is becoming general practice to use the heating value of the gas as a basis for determining its selling price, and therefore it is important that some means may be provided for making a continuous record of the heating value of a gas.

In the manufacture of artificial gas the composition and heating value of the gas varies quite widely, depending upon the stage in the process of manufacture at which the gas is made. For example, in coke ovens and gas benches the calorific value of the gas made when the coal is freshly charged is very much higher than the calorific value of the gas which is discharged from the coke at the end of the coking operation. Furthermore, in the manufacture of water gas by the means of hot coke and steam the heat value of the gas varies from time to time as the operation progresses. It is very desirable, therefore, that a continuous record of the heat value of the gas be made, in order to control the heat value of the gas being made. Some cities require that the gas to be sold shall have a minimum heat value and it is often necessary to increase the heat value of the gas by adding oil gas to the coal or coke gas. With a continuous record of the heat value of the gas an operator may accurately control the amount of oil used for enriching the gas and thus produce a gas of uniform quality and conserve the amount of oil to be used.

When the heat value of a gas is to form the basis of its selling price it is necessary that the heat measurement be accurate, reliable and continuous. Also, it is necessary that the heat measurement may be made automatically by an apparatus which does not require the constant attention of a skilled operator, and the apparatus should be simple in construction and simple in operation, so that the unskilled operator may readily keep the apparatus in running condition.

The primary object of the present invention is to provide a continuous recording calorimeter which is accurate in its measurements and simple in its construction and operation.

Another object of the invention is to provide a continuous recording calorimeter with means by which the operation of the recording mechanism may be checked at any time.

A further object of the invention is to provide a continuous recording calorimeter in which the heat value of a gas may be recorded directly for standard conditions of temperature and pressure.

Another object of the invention is to provide a gas and water measuring mechanism for a continuous calorimeter which is simple in construction and accurate in measurement.

With these and other objects and features of the invention in view, the invention consists in the improved calorimeter hereinafter described and particularly defined in the claims.

The various features of the invention are illustrated in the accompanying drawings in which:

Fig. 1 is a diagrammatic elevational view of a continuous recording calorimeter embodying the preferred form of the invention, Fig. 2 is a top plan view of the calorimeter gas and water measuring apparatus shown in Fig. 1, Fig. 3 is a vertical sectional view of the gas and water measuring mechanism taken on the line 3—3 of Fig. 2, Fig. 4 is a vertical sectional view of the gas and water measuring apparatus taken on the line 4—4 of Fig. 2, and Fig. 5 is a vertical sectional view of the gas and water measuring apparatus taken on the line 5—5 of Fig. 2.

To determine the calorific value of a gas in accordance with the present invention, a measured volume of gas is burned in a combustion chamber so that the products of combustion pass into heat interchanging relation with a measured volume of water, whereby the water absorbs substantially all the heat of the gas, and the rising temperature of the water due to the absorption of the heat of combustion of the gas is taken as a basis of the calorific value of the gas. The water flowing into the heat transferring chamber is maintained at a temperature below the normal room temperature by an amount substantially equal to the amount of rise in temperature which the water will be given by the absorption of the heat of the combustion of gas, so that the products of combustion of the gas and the water will be discharged from the calorimeter at substantially room temperature. The volume of water being heated is the same as the volume of gas being burned so that the rise in temperature of the water multiplied by the specific heat of the water is a direct determination of the calorific value of the gas. To insure that the volume of water and the gas are equal the gas and water are placed under the same pressure, the water and the gas are measured with the same measuring container, and the water is used for displacing the gas volume for volume. The measuring mechanism is continuously operated to measure equal volumes of water and gas so that the water flows through the heat interchanger continuously and the gas is continuously burned. The rise in temperature of the water passing through the heat interchanger is preferably measured by means of a differential resistance thermometer, which is provided with a recording mechanism for automatically recording the temperature differential on a chart, and preferably the chart is calibrated so as to indicate directly the heat value of the gas in British thermal units.

Referring more particularly to the apparatus shown in the drawings, the measured volume of the gas is burned in a burner 10 which projects into a combustion chamber located in the interior of a hollow U-shaped calorimeter tube 12. The water to be heated by the combustion of the gas in the burner 10 is introduced through a tube 14 and passes into a water jacket in the U-shaped tube 12 which surrounds the central combustion chamber. The temperature of the water passing into the calorimeter tube 12 is measured by a thermometer 16 and the temperature of the water leaving the calorimeter is measured by means of thermometer 18. In the present invention the inlet and outlet temperatures are also measured by means of electrical resistance elements 20 and 22, which are positioned respectively adjacent the bulbs of the thermometers 16 and 18. The U-tube calorimeter illustrated in the drawings substantially has the same construction and mode of operation as the calorimeter illustrated and described in the patent to W. G. Laird, 1,354,568, granted October 5, 1920, and reference is hereby made to this patent for a detailed description of the construction and mode of operation of the calorimeter.

The gas being burned in the burner 10 and the water being passed through the water chamber of the U-tube calorimeter are maintained under the same pressure and are used in equal volumes. The gas flows continuously to the burner 10 and the water circulates continuously through the water chamber so that by taking a continuous indication or record of the rise in temperature of the water a continuous calorific value of the gas may be determined. The apparatus for measuring the water and gas is shown more particularly in Figures 2, 3, 4 and 5. The gas to be measured is drawn from a suitable source through a sampling tube 24, passes through a constant pressure regulator 26 and then flows through a pipe 28 to a gas compartment 30 of a receiving container 32. The container 32 is provided with a water compartment 34, the water being introduced into the compartment through a pipe 36. With this construction the gas and water to be measured are held in contact with one another and are therefore under the same pressure.

The measurement of the gas and water is effected by means of a displacement meter 38 which is rotatably mounted in the container 32, so that the meter will pass during its rotation alternately through the gas and water compartments. The meter 38 consists of a hollow tube having the form of an S. The central portion of the S is connected with a hollow axle 40 so that the meter is divided into two hollow tubes, each tube having its inner end connected to the axle and its outer end being opened and arranged to sweep through the gas and water compartments. Each tube of the meter is so positioned with reference to the hollow axle that a portion of it will extend above the axle and the other portion will extend below the axle. By this means the tube will always provide a water sealed trap to prevent gas which has been measured from passing back into the compartment 30. The meter 38 is rotatably mounted on the axle 40 and is provided with a suitable packing gland to prevent leakage from the tube 40 into the container 32, or vice versa. The meter is rotated by means of a constant speed motor 42 which is connected by means of a shaft 44 and gears 46 and 48 with the hub of the meter. Although it is preferred that the motor 42 shall have a constant speed in order to maintain a uniform flow of water and gas to the calorimeter, it is not essential that the speed may be constant, because the meter 38 will always deliver the same volume of water and gas and therefore the variation in speed of the motor will only be reflected in the velocity with which the gas is burned and the water flows through the calorimeter.

The level of the water in the compartment 34 is used as a means for obtaining a uniform and accurate measurement of the gas and water. Accordingly, the upper peripheral edge of a side wall 50 defining the water compartment 34 is in the form of a weir and the water level is controlled by maintaining a predetermined head over the weir. To accomplish this the water introduced through the pipe 36 flows through the water compartment 34 in greater volume than the amount of water removed through the meter 38 and a continuous flow of water is maintained through the measuring apparatus. The water flowing over the weir edge of the side wall 50 accumulates in a trough 51 surrounding the water compartment and flows through an opening 53 into a float compartment 52 and flows out of the compartment through an outlet pipe 54, Fig. 1. A valve 56 in the outlet pipe 54 is used for maintaining a predetermined level in the float compartment and a float 58 mounted in the compartment is connected with a valve 60 in the water inlet pipe 36. With this construction the valve 60 will be controlled by the float 58 to maintain a predetermined head over the weir, the head being determined by the level of the water in the float compartment 52. The float 58 will move up and down in accordance with the water level in the float compartment 52 and will simultaneously adjust the valve 60 in order to control the flow of water passing into the inlet compartment to maintain a uniform head of water over the weir. By adjusting the valve 56 and links 62 and 64 in the connections between the float 58 and valve 60 the head of water over the weir may be varied in order to maintain any desired water level in the compartment 34.

The water and gas which are measured by the meter 38 are continuously and simultaneously passed from the meter through the hollow axle 40 into a discharging container 66. The container 66 has a water compartment 68 and a gas compartment 70, these compartments being so arranged that the measured gas and water are in contact with one another and are therefore under the same pressure. The water from the compartment 68 passes out through the tube 14 to flow to the water chamber of the calorimeter U tube. The gas from the compartment 70 passes out through a tube 72 in passing to the burner 10. A valve or pinch cock 74 is positioned on the tube 14 by which the flow of water may be controlled in order to maintain a substantially uniform level of water in the container 66 which may be indicated by the gauge 76. It is not essential that the water level in the container 66 be constant but if this level is constant the gas and water will flow to the calorimeter with a uniform rate and pressure and will therefore maintain more favorable conditions for determining the heat value of the gas.

The rise in temperature of the water in the water chamber of the calorimeter U tube is preferably measured by means of a differential electric resistance thermometer. As illustrated in the drawings this resistance thermometer is provided with a Wheatstone bridge measuring mechanism for operating the recording mechanism and for indicating the temperature difference or calorific value of the gas. The Wheatstone bridge contains known resistances 78 and 80 which have a constant ratio and are located in two arms of the bridge. The resistances of the resistance thermometers 20 and 22 are unknown and variable, due to the fact that they are positioned in the inlet and outlet wells of the calorimeter. The resistance of thermometer 20 is located in the arm 84 of the bridge and the resistance of thermometer 22 is located in the arm 86 of the bridge. A battery 90 is connected between a junction point 92 of the bridge arms 78 and 80 and a point on a known resistance 94. The resistance 94 is connected between the terminal points of the bridge arms 84 and 86. By adjusting an arm 96 of the battery connection along the resistance 94 a point may be found wherein no current will flow between the points 98 and 100 of the Wheatstone bridge. With a condition of no current flow between the terminal points 98 and 100 the ratio of resistances 78 to 80 will be equal to the ratio of the resistances 20 plus the resistance of the portion X on the resistance 94 to the resistance 22 plus the resistance 94 minus the resistance of the portion X. These proportional relations may be used as the means of determining the temperature differential of water flowing through the calorimeter. The movement of the terminal 96 is preferably made by means of a motor, not shown, which is controlled by a galvanometer 102. The means by which the difference in temperature is indicated and the calorific value of the gas is recorded does not form a part of the applicant's invention, and therefore is not described in detail. A detailed description of the construction and mode of operation of the automatic differential recording thermometer is clearly described in Technological Paper #170 of the Bureau of Standards, entitled "Pyrometric practice," pages 159 and following, and in the patent to Leeds, 965,824, granted July 26, 1910. Reference is hereby made to said technological paper and patent for a detailed description and mode of operation of the recording thermometer.

The calorific value of gas is calculated upon the basis that the gas being measured is under standard conditions of pressure and temperature. If the gas being burned in the calorimeter is not under standard conditions of pressure and temperature, the corrections are automatically made in the heat value being indicated and recorded by the thermometer to correct the value for standard conditions of pressure and temperature.

To accomplish this an expansible diaphragm 104 is positioned in the gas compartment of the discharging container 66, see Figs. 1, 4 and 5. The diaphragm 104 is hollow, and contains a gas which is sealed in the diaphragm under standard conditions of pressure and temperature. The lower portion of the diaphragm 104 is fixed to a cross bar 106 in the compartment 70 and therefore the changes of pressure and temperature of the gas in the compartment 70 will cause the gas within the diaphragm to expand or contract in accordance with the comparative temperatures and pressures of the gas inside and outside of the diaphragm. The expansion and contraction of the diaphragm is utilized to vary a resistance in one arm of the Wheatstone bridge of the recording thermometer to such an extent that the record or indication will automatically be corrected to standard conditions of pressure and temperature. To this end a stem 108 is connected to the upper or movable side of the diaphragm and passes through a flexible closing strip 110 mounted on the top of the compartment 70. The stem 108 is connected with an arm 112, Fig. 1, of a rheostat 114.

The arm 112 moves over a series of contacts 116 to vary the resistance in the rheostat 114, in accordance with the movements of the expansible diaphragm 104. The rheostat 114 is connected in turn in the arm 86 of the Wheatstone bridge.

With the construction outlined above the water and gas being used for determining the calorific value of the gas are measured in equal volumes, the measurement being made in the same compartment and the water being used for displacing the gas volume for volume. The gas and water are always in equal proportions and under the same pressure. The amount of water used for the determination is small compared with the amount of water used in the usual calorimeter and therefore the temperature rise is comparatively large. In other words, the amount of gas being burned is comparatively large and the errors of the machine are thereby minimized. The measuring mechanism does not need to be calibrated nor adjusted and it is not necessary to employ an expensive constant speed mechanism for the driving motor. By the use of two sets of thermometers, one set being mercurial thermometers, and the other electrical resistance thermometers, the record and indication of the electrical thermometers may be checked at any time by means of the mercury thermometers. This affords an accurate check on the resistance thermometer, and provides a means by which the resistance thermometer may be very accurately adjusted because the temperature differential as indicated by the mercury thermometers is made with reference to the same gas and simultaneously with the indication being made on the resistance thermometer.

The preferred form of the invention having been thus described, what is claimed as new is:

1. A method of determining the calorific value of gas which comprises burning gas in heat interchanging relation with water, continuously measuring the water prior to its being heated, continuously measuring the gas being burned by displacing the gas with the measured water volume for volume, and continuously recording the rise in temperature of the water due to the heat of combustion of the gas in terms of the B. t. u. value of the gas.

2. A method of determining the calorific value of gas which comprises burning gas in heat interchanging relation with water, continuously supplying gas to the burner in a volume equal to the volume of water being heated, utilizing the water prior to its being heated to measure the gas, and continuously recording the rise in temperature of the water due to the heat of combustion of the gas in units corresponding to the heat value of the gas.

3. A method of determining the calorific value of gas which comprises burning gas in heat interchanging relation with water, continuously supplying gas to a burner in a volume equal to the volume of water being heated, utilizing the water prior to its being heated to measure the gas, continuously recording the rise in temperature of the water due to the heat of combustion of the gas in units corresponding to the heat value of the gas and reducing the temperature record to standard conditions of pressure and temperature.

4. A method of determining the calorific value of gas which comprises burning gas in heat transferring relation with water, supplying the gas and water to a container wherein they contact one another, simultaneously and continuously withdrawing the gas and water from the container in measured portions by displacing the gas with the water volume for volume, and recording the rise in temperature of the water due to the heat of combustion of gas in units corresponding to the heat value of the gas.

5. A method of determining the calorific value of gas which comprises passing water through a heat interchanger, burning gas so that the products of combustion pass in heat interchanging relation with water in the heat interchanger, supplying gas and water to a container wherein they contact one another, simultaneously and continuously withdrawing the gas and water from the container in measured portions by displacing the gas with the water volume for volume, passing the water and gas through a chamber in contact with one another in their passage to the heat interchanger and burner respectively, and recording the rise in temperature of the water due to the heat of combustion of gas in units corresponding to the heat value of the gas.

6. A method of determining the calorific value of gas which comprises burning gas in heat interchanging relation with water, continuously measuring the water being heated, continuously measuring the gas being burned by displacing the gas with the measured water volume for volume, equalizing the pressure of the measured gas and water and then sending them to the burner and heat interchanger respectively, and recording the rise in temperature of the water due to the heat of combustion of the gas in units corresponding to the heat value of the gas.

7. A method of determining the calcrific value of gas which comprises burning gas in heat interchanging relation with water, equalizing the pressure of water being heated with the pressure of gas being burned, and continuously measuring the volume of gas and water while under the same pressure by displacing the gas volume for volume with the measured volumes of water, and recording the rise in temperature of water due to the heat of combustion of gas in units corresponding to the heat value of the gas.

8. A method of determining the calorific value of gas which comprises burning gas in heat interchanging relation with water, continuously measuring the water being heated, continuously measuring the gas being burned by displacing the gas with the measured water volume for volume, equalizing the pressure of the measured gas and water and then sending them respectively to the burner and heat interchanger, comparing the pressure and the temperatures of the pressure equalized gas with standard conditions of pressure and temperature, and indicating the rise in temperature of water due to the heat of combustion of the gas in terms of the B. t. u. value of the gas corrected for standard conditions of pressure and temperature.

9. In a gas calorimeter, a combustion chamber having a gas burner therein, a water chamber mounted in heat interchanging relation to the combustion chamber, means for measuring the rise in temperature of the water passing through the water chamber, and means for measuring the water and gas prior to passing to their respective chambers, comprising means for continuously measuring separate volumes of gas and water that have a definite proportional relationship to one another while using the water for displacing the gas being measured.

10. In a gas calorimeter, a combustion chamber having a gas burner therein, a water chamber mounted in heat interchanging relation to the combustion chamber, means for measuring the rise in temperature of water passing through the water chamber, and means for measuring the water and gas passing through their respective chambers comprising a container for the water and gas, a hollow measuring device rotatable alternately through the water and gas spaces of the container to collect predetermined volumes in each space, means to rotate the measuring device, and means to separately conduct the measured water and gas to the water chamber and burner respectively.

11. In a gas calorimeter, a combustion chamber having a gas burner therein, a water chamber mounted in heat interchanging relationship to the combustion chamber, means for measuring the rise in temperature of the water passing through the water chamber, and means for measuring the water and gas passing through their respective chambers comprising a container for the water and gas, a measuring tube attached at one end to a hollow axle and the other end opening into the container with one portion of the tube extending below the axle and another portion of the tube extending above the axle, means for rotating the tube, and means to separately conduct measured volumes of water and gas from the container to the chamber and burner respectively.

12. In a gas calorimeter, a combustion chamber having a gas burner therein, a water chamber mounted in heat interchanging relationship to the combustion chamber, means for measuring the rise in temperature of the water passing through the water chamber, and means for measuring the water and gas passing to their respective chambers comprising a container for the water and gas, a hollow measuring device mounted to rotate alternately through the water and gas spaces of the container to collect predetermined volumes in each space, means to rotate the measuring device, a valve controlled inlet for introducing water to the container, and means for controlling the valve to maintain a definite water level in the container.

13. In a gas calorimeter, a combustion chamber having a burner therein, a water chamber mounted in heat interchanging relation to the combustion chamber, means for measuring the rise in temperature of the water passing through the water chamber, and means for measuring the water and gas passing to their respective chambers comprising a receiving container for water and gas, a displacement meter rotatably mounted in the container so as to pass through the water and gas therein, means to maintain a predetermined level of water in the container, and means to separately conduct measured water and gas from the container to the water chamber and burner respectively.

14. In a gas calorimeter, a combustion chamber having a gas burner therein, a water chamber mounted in heat interchanging relationship to the combustion chamber, means for measuring the rise in temperature of the water passing through the water chamber, and means for measuring the water and gas passing through their respective chambers comprising, a container for maintaining a body of water in contact with a body of gas, a weir in the container for controlling the level of the body of water therein, a measuring device arranged to be rotated alternately through the gas body and water body to collect predetermined volumes from each body, means to rotate the measuring device, means to introduce gas and water into the container, means to control the flow of water through the container to maintain a predetermined head of the water over the weir, and means to separately conduct measured volumes of water and gas from the container to the water chamber and burner respectively.

15. In a gas calorimeter, a combustion chamber having a burner therein, a water chamber mounted in heat interchanging relationship to the combustion chamber, a continuously indicating thermometer for measuring the rise in temperature of water passing through the water chamber, means for measuring definite volumes of gas and water and conducting them directly to the burner and water chamber respectively, means located in the path of flow of the gas and connected with the thermometer to vary the temperature indication in accordance with the variations in the temperature and pressure of the measured gas from standard conditions of temperature and pressure.

16. In a gas calorimeter, a combustion chamber having a burner therein, a water chamber mounted in heat interchanging relationship to the combustion chamber, a continuously operating recorder for recording the rise in temperature of water due to the heat of combustion of the gas in units corresponding to the heat value of the gas, means for measuring definite volumes of gas and water and conducting them directly to the burner and water chamber respectively and an aneroid diaphragm located in the path of flow of the measured gas and connected with the recording mechanism to vary the heat value recorded in accordance with the variations of temperature and pressure of the measured gas from standard conditions of temperature and pressure.

17. In a gas calorimeter, a combustion chamber having a burner therein, a water chamber mounted in heat interchanging relationship to the combustion chamber, means for measuring the rise in temperature of the water passing through the water chamber, a displacement meter for continuously measuring separate volumes of gas and water having a definite proportional relationship to one another, and means for separately conducting the measured gas and water to the burner and water chamber respectively.

18. In a gas calorimeter, a combustion chamber having a burner therein, a water chamber mounted in heat interchanging relationship to the combustion chamber, a continuously recording differential electrical resistance thermometer having resistance elements positioned at the inlet and outlet of the water chamber, means for measuring definite volumes of water and gas and conducting them directly to the burner and water chamber respectively, an expansible diaphragm located in the path of flow of the measured gas, an adjustable resistance element connected with the diaphragm and an electrical connection between the resistance element and the thermometer.

19. In a gas calorimeter, a combustion chamber having a burner therein, a water chamber mounted in heat interchanging relationship to the combustion chamber, means for measuring the rise in temperature of the water passing through the water chamber, and means for measuring the water and gas passing through their respective chambers comprising, a receiving container having a water compartment and a gas compartment, a weir for the water compartment, a pipe for conducting water into the container, a valve in the said pipe, a float compartment in the container, a float mounted in the float compartment and connected with said valve, a water outlet for the float compartment, a gas inlet for the receiving container, a hollow measuring device rotatably mounted in the container with one end fixed to a hollow axle and the other end being open and movable through the gas and water compartments, a discharging container communicating with the hollow axle having a water space and a gas space, a conduit connected between the gas space and the gas burner, and a conduit connected between the gas space and the inlet of the water chamber.

In testimony whereof I affix my signature.

EDMUND G. BORDEN.